E. F. JONES AND P. F. W. BAYLEY.
HEADLIGHT SWIVELING APPARATUS.
APPLICATION FILED OCT. 25, 1917.

1,332,903.

Patented Mar. 9, 1920.

E. F. Jones.
P. F. W. Bayley.
Inventors.

By Albert N. Parker
Attorney.

UNITED STATES PATENT OFFICE.

ERNEST FREDERICK JONES AND PERCY FRANK WALKER BAYLEY, OF EPSOM, AUCKLAND, NEW ZEALAND.

HEADLIGHT-SWIVELING APPARATUS.

1,332,903.  Specification of Letters Patent.  Patented Mar. 9, 1920.

Application filed October 25, 1917. Serial No. 198,416.

*To all whom it may concern:*

Be it known that we, ERNEST FREDERICK JONES and PERCY FRANK WALKER BAYLEY, citizens of the Dominion of New Zealand, and residing at Manukau Road, Epsom, and King Edward avenue, Epsom, respectively, in the Provincial District of Auckland, in the Dominion of New Zealand, have invented certain new and useful Improvements in Headlight-Swiveling Apparatus, of which the following is a specification.

This invention relates to apparatus for swiveling lamps or headlights of motor cars and other vehicles, and provides means whereby the lamps can be easily and readily swiveled to the right or left at the will of the driver of the vehicle.

The invention may be conveniently and advantageously carried into practice as shown in the accompanying drawing, wherein:—

Figure 4:
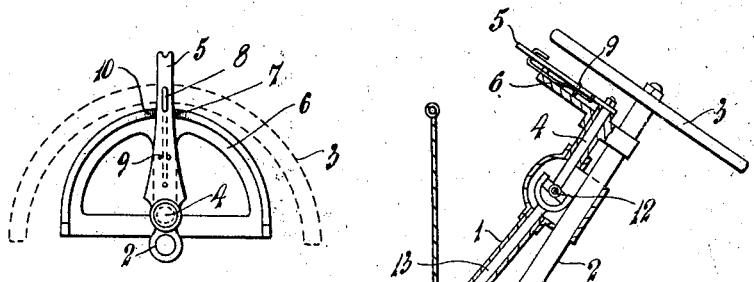
Figure 1:
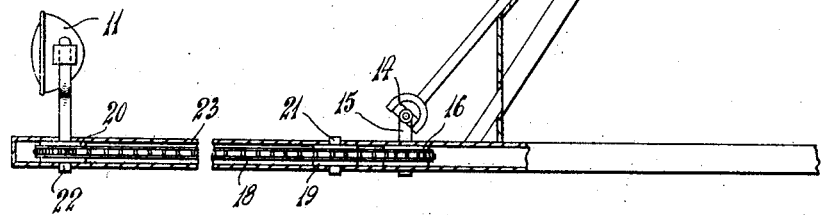
Figure 1, is a longitudinal sectional elevation.
Figure 2:
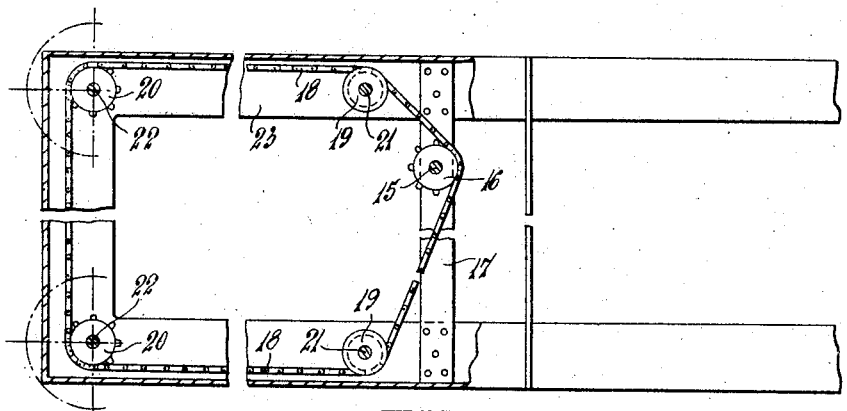
Fig. 2, is a sectional plan of the apparatus.

Fig. 4, a plan of the upper part of the apparatus, and

Figures 3, 5:
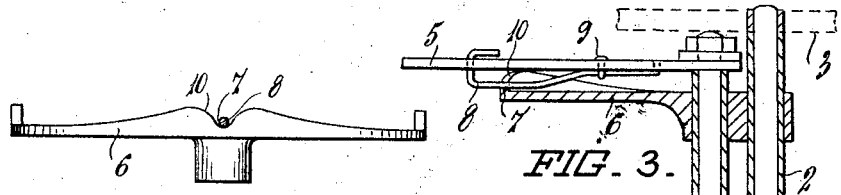
Fig. 3, is a sectional elevation.

Fig. 5, is a front elevation of a sector.

The hollow standard 1 is supported by the usual standard 2 of the steering wheel 3 of a motor car or the like, or is otherwise supported so that a rod 4 may turn in the said standard 1. A lever 5, immediately below and projecting slightly beyond the steering wheel 3, is fixed to the rod 4. A sector 6 fixed to the standards 1 and 2 below the lever 5 has a notch 7 adapted to hold a spring 8 fixed at one end by a rivet or clip 9 to the lever 5, and the edges 10 of the notch are sloped or curved. When the spring 8 is in the notch 7 the lever 5 is held centrally, and the lamps 11 throw their rays directly ahead.

The lower end of the rod 4 is connected by a universal joint 12 to a rod 13, the lower end of which is connected by a universal joint 14 to the shaft 15 of a sprocket wheel 16, the said shaft being mounted on a bracket or bar 17. An endless sprocket chain 18 passes around the sprocket wheel 16 and around guide sprocket wheels 19 and around sprocket wheels 20 fixed to shafts 21 and 22 respectively vertically mounted in the frame 23 of the vehicle. The lamps 11 are attached to the shafts 22 and are adapted to swivel therewith.

Normally the lever 5 is held by the spring 8 while the latter is engaged by the notch 7, but when it is desired to direct the light of the lamps 11 to either side of a road the lever 5 is pushed by the fingers of the driver to the right or left as required. The sloping or curved sides 10 of the notch 7 permit the lever 5 to be pushed over without compressing the spring 8 by hand. The pushing over of the lever 5 operates the sprocket wheel 16, the chain 18 and the sprocket wheels 20, and swivels the lamps 11 to right or left as desired.

The movement of the lever 5 and the lamps 11 is effected independently of the movement of the steering wheel 3.

What we do claim and desire to secure by Letters Patent of the United States is:—

1. In a self-propelled vehicle, the combination with the steering post of said vehicle, of a headlight, means supporting said headlight for movement about an axis, a shaft, means supporting said shaft for movement about an axis parallel with the first named axis, driving members secured to said headlight and said shaft, a flexible driving element extending around said driving members, means rotatably supported upon said steering post in proximity to the steering wheel thereon but operable independently of the latter, and means connecting the last named means with said shaft.

2. In a self-propelled vehicle, the combination with the steering post of said vehicle, of a headlight, a rotatable shaft supporting said headlight for movement about an axis, a sprocket wheel secured to said shaft, a second shaft rotatable about an axis parallel with the first named axis, a sprocket wheel secured to the second shaft, a sprocket chain passing around said sprocket wheels, means rotatably supported upon said steering post in proximity to the steering wheel thereon but operable independently of the latter, and means connecting the last named means with the second shaft.

3. In a self-propelled vehicle, the combination with the steering post of said vehicle, of a headlight, a rotatable shaft supporting said headlight for movement about an axis, a sprocket wheel secured to said shaft, a second shaft rotatable about an axis parallel with the first named axis, a sprocket wheel secured to the second shaft, a sprocket chain passing around said sprocket wheels, a third shaft rotatable about an axis parallel with that of the steering post, means carried by said post supporting said third shaft, an operating member secured to the upper end of said third shaft, said member being positioned in proximity to the steering wheel, and a fourth shaft universally connected at its opposite ends with the upper end of the third shaft and the lower end of the fourth shaft.

In testimony whereof we have signed our names to this specification in the presence of two witnesses.

ERNEST FREDERICK JONES.
PERCY FRANK WALKER BAYLEY.

Witnesses:
D. W. CONNELL,
D. RAPSON,